(12) United States Patent
Izumi et al.

(10) Patent No.: US 10,348,219 B2
(45) Date of Patent: Jul. 9, 2019

(54) ELECTROSTATIC INDUCTION POWER GENERATOR

(71) Applicant: CITIZEN WATCH CO., LTD., Tokyo (JP)

(72) Inventors: Akira Izumi, Tokyo (JP); Takashi Ihara, Tokyo (JP); Makoto Watanabe, Saitama (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 218 days.

(21) Appl. No.: 15/128,847

(22) PCT Filed: Feb. 27, 2015

(86) PCT No.: PCT/JP2015/055844
§ 371 (c)(1),
(2) Date: Sep. 23, 2016

(87) PCT Pub. No.: WO2015/146483
PCT Pub. Date: Oct. 1, 2015

(65) Prior Publication Data
US 2017/0110988 A1 Apr. 20, 2017

(30) Foreign Application Priority Data

Mar. 26, 2014 (JP) .................................. 2014-063824

(51) Int. Cl.
*H02N 1/08* (2006.01)
(52) U.S. Cl.
CPC ..................................... *H02N 1/08* (2013.01)

(58) Field of Classification Search
CPC .................................................... H02N 1/08
See application file for complete search history.

(56) References Cited

U.S. PATENT DOCUMENTS

| 2,194,839 A | * | 3/1940 | Van De Graaff | ........ | H02N 1/08 |
| | | | | | 310/309 |
| 2,610,994 A | * | 9/1952 | Bosch | ...................... | H02N 1/08 |
| | | | | | 307/109 |

(Continued)

FOREIGN PATENT DOCUMENTS

| EP | 2525487 A1 | 11/2012 |
| JP | S52-016346 U | 2/1977 |

(Continued)

OTHER PUBLICATIONS

European Patent Office, Partial Supplementary European Search Report for EP patent application No. 15769560.2, dated Nov. 9, 2017.

(Continued)

*Primary Examiner* — Robert W Horn

(57) ABSTRACT

A board arrangement structure includes a housing, a first board fastened to the housing, a second board arranged in parallel enabling, relative movement with respect to the first board, an electrically charged film, a counter electrode, and an output part outputting electric power generated between the electrically charged film and the counter electrode, at least one of the electrically charged film and the counter electrode being arranged at a first facing surface of the first board and the other being arranged at a second facing surface of the second board facing the first facing surface, and the first facing surface of the first board being, fastened to a reference mounting surface provided at the housing.

7 Claims, 14 Drawing Sheets

(56) References Cited

U.S. PATENT DOCUMENTS

| | | | | |
|---|---|---|---|---|
| 2,656,502 A * | 10/1953 | Felici | ............... | H02N 1/08 310/309 |
| 2,679,440 A * | 5/1954 | Annen | ............... | F16C 19/163 368/207 |
| 2,739,248 A * | 3/1956 | Meier | ............... | H02N 1/08 310/309 |
| 2,843,767 A * | 7/1958 | Whitlock | ............... | H02N 1/08 310/309 |
| 3,013,201 A * | 12/1961 | Goldie | ............... | H02N 1/08 310/309 |
| 3,080,703 A * | 3/1963 | Body | ............... | G04B 31/08 368/324 |
| 3,696,258 A * | 10/1972 | Anderson | ............... | G04C 3/16 310/10 |
| 4,250,415 A * | 2/1981 | Lewiner | ............... | H02N 1/08 307/400 |
| 5,630,155 A | 5/1997 | Karaki et al. | | |
| 6,833,687 B2 * | 12/2004 | Landolt | ............... | H02N 1/00 320/166 |
| 8,303,170 B2 * | 11/2012 | Fujieda | ............... | G04B 31/04 368/324 |
| 9,479,085 B1 * | 10/2016 | Ludois | ............... | H02N 1/004 |
| 2004/0007877 A1 * | 1/2004 | Boland | ............... | H02N 1/08 290/1 R |
| 2004/0016120 A1 * | 1/2004 | Boland | ............... | H02N 1/08 29/886 |
| 2007/0159931 A1 * | 7/2007 | Rufenacht | ............... | G04B 29/022 368/294 |
| 2010/0194236 A1 * | 8/2010 | Verkoglyad | ............... | H02N 1/08 310/308 |
| 2013/0134830 A1 * | 5/2013 | Ikuta | ............... | H02N 1/08 310/309 |
| 2017/0110988 A1 * | 4/2017 | Izumi | ............... | H02N 1/08 |
| 2017/0133952 A1 * | 5/2017 | Matsumoto | ............... | H02N 1/08 |
| 2017/0269557 A1 * | 9/2017 | Ihara | ............... | G04C 10/00 |
| 2018/0026552 A1 * | 1/2018 | Nagata | ............... | H02N 1/08 310/309 |

FOREIGN PATENT DOCUMENTS

| | | |
|---|---|---|
| JP | H04-340118 A | 11/1992 |
| JP | H09-120632 A | 5/1997 |
| JP | 2005-529574 A | 9/2005 |
| JP | 2009-148124 A | 7/2009 |
| JP | 2011-072070 A | 4/2011 |
| JP | 2012-138514 A | 7/2012 |
| JP | 2013-059149 A | 3/2013 |
| JP | 2013-188046 A | 9/2013 |

OTHER PUBLICATIONS

International Search Report for PCT/JP2015/055844, dated May 19, 2015.
Written opinion of the International Searching Authority for PCT/JP2015/055844, dated May 19, 2015.
State Intellectual Property Office of the People's Republic of China, Office Action for Chinese patent application No. 201580016481.8, dated Dec. 29, 2017.

* cited by examiner

ELECTROSTATIC INDUCTION POWER GENERATOR

TECHNICAL FIELD

The present invention relates to a power generation system, power generator, portable electrical apparatus, portable clock, etc. utilizing electrostatic induction. As the source of energy for the power generator of the present invention, motion of the human body, vibration of a machine etc., and other kinetic energy widely available in the environment can be utilized.

BACKGROUND ART

A practical power generation system utilizing electrostatic induction by an electret material has been disclosed in PLTs 1 to 3. "Electrostatic induction" is the phenomenon of an electric charge of a reverse polarity from an electrically charged object being attracted if the electrically charged object is made to approach a conductor. A power generation system utilizing the phenomenon of electrostatic induction utilizes this phenomenon in a structure provided with a "film holding an electric charge" (below, referred to as an "electrically charged film") and a "counter electrode". It makes the two move relative to each other to induce an electric charge and takes it out to generate power.

Taking the case of an electret material as an example, an electret is a dielectric material which has a charge and forms a quasi-permanent electrostatic field. In generation of power by this electret, as seen in FIG. 1. The electrostatic field formed by the electret 3 causes an induced charge at the counter electrode (electrode) 2. If changing the overlapping area of the electret and counter electrode (vibration etc.), it is possible to generate an AC current at an external electrical circuit 200. The generation of power by this electret utilizes a relatively simple structure and is based on electromagnetic induction, so can generate a high output in the low frequency region. It is therefore advantageous and is being focused on in recent years for so-called "energy harvesting".

PLT 1 discloses a portable vibration power generator utilizing the low frequency vibration caused by motion of the human body as external energy by a horizontal vibration type electret device. PLT 2 discloses a power generation system utlizing electrostatic induction such as used for a mechanical type self-winding wristwatch which transmits the rotation of a rotor increased in speed through a gear mechanism to make the electret film and electrode rotate relatively. Further, PLT 3 discloses a power generation system utilizing electrostatic induction to periodically drive back and forth motion of an electret film and electrode wherein the rotor is supported through an elastic member and the rotor is made to vibrate sympathetically. The prior art of PLT 3 uses the elastic member to cause sympathetic vibration to increase the amplitude of rotation and improve the power generation efficiency. However, in these prior art, in each case, the technical idea of accurately controlling the gap between the electret film and electrode to try to raise the power generation efficiency is not shown in any way.

Further, PLT 4 discloses a mechanism of a clock in which backlash of a screw part of a bearing part at a balance staff or shaft of an escape wheel or other shaft is eliminated by insertion of a spring washer. However, in a conventional mechanical type clock, there is no need for accurate positioning of the shaft in the axial direction. Not only this, the technical idea of accurately controlling the gap between the electret film and electrode to try to raise the power generation efficiency is not shown at all.

CITATION LIST

Patent Literature

PLT 1: Japanese Unexamined Patent Publication No. 2012-138514A
PLT 2: Japanese Unexamined Patent Publication No. 2011-72070A
PLT 3: Japanese Unexamined Patent Publication No. 2013-59149A.
PLT 4: Microfilm of Japanese Utility Model Application No. 50-102254 (Japanese Unexamined Utility Model Publication No. 52-016346U)
PLT 5: Published Japanese Translation of PCT International Publication for Patent Application No. 2005-529574A

SUMMARY OF INVENTION

FIG. 2 is a graph showing the relationship between an electrically charged film-counter electrode gap "g" and amount of power generation. FIG. 3 and the following formula show a load matched power equation showing the relationship of the electrically charged film-counter electrode gap "g" and amount of power generation P.
P can be calculated from the next formula:

$$P = \frac{\sigma^2 \times n \times A \times f}{4 \frac{\varepsilon \times \varepsilon 0}{d} \left( \frac{\varepsilon \times g}{d} + 1 \right)}$$

$$\sigma = \frac{K \times \varepsilon 0}{d}$$

σ: surface load density
d: thickness
ε: permittivity
g: electret-electrode gap
A: electrode area
P: power generation amount
f: vibration frequency
n: number of poles per one vibration
ε0: dielectric constant of vacuum
K: relative permittivity FIG. 2 shows the amount of power generation with respect to the electrically charged film-counter electrode gap "g" (interboard gap "g") based on the load-matched power equation of the above formula described in the research of Justin Boland et al. (see PLT 5). As will be understood from the graph of FIG. 2, the gap "g" between the electret film and power generation electrode contributes more to the amount of power generation the more the electrically charged film-counter electrode gap "g" falls below 100μ.

In the prior art as seen in PLT 2, in the past, a board was placed on the plate forming the base of the power generator and the electret film was formed on this board. Further, a counter electrode was arranged at the bottom surface of a rotating plate facing this electret film. The shaft of the rotating plate was supported by bearings at the top and bottom. In the case of such prior art, the gap "g" between the electret film and power generation electrode greatly fluctuated due to the following processing precision of three parts (board, shaft, and bearing).

(1) thickness of board
(2) loosening of shaft. (backlash or play)
(3) positional precision and dimensional precision of bearing
(4) dimensional precision of shaft In the prior art such as seen in PLT 2, the bottom surface of the board is placed on the top of the plate forming the base forming the power generator and a gap is formed between the electret film on the top surface of the board and the counter electrode formed on the bottom surface of the rotating plate. For this reason, variation in the difference of the parts due to the above processing precision (loosening) ends up causing variation in the gap between the electret film and counter electrode. In power generation by the rotating plate, the loosening caused at the shaft ends up greatly affecting the posture of the rotating plate and greatly changes the gap between the electret film and electrode. On the other hand, as seen in FIG. 2, in electret power generation, the more the gap "g" approaches zero, the larger the amount of power generation that can be obtained. That is, the more the variation in the difference of the parts is, the greater the variation of the amount of power generation is. When based on mass production, it is necessary to give a certain extent of tolerance to the parts, so these were parts forming a bottleneck for obtaining a stable amount of power generation.

To deal with such a problem, it is necessary to produce parts with an extremely high precision at the time of processing, but there were problems in fabricating these parts in terms of the yield of the parts and in terms of the cost. Further, in the prior art where the bottom surface of the board was carried on the top of the plate forming the base and where the electret film was formed on the top surface of the board, the effect of variation in thickness of the board itself was extremely great, so to make the electret film and electrode closer, it was necessary to fabricate the board to become smaller in variation of thickness. It was necessary to use an expensive board such as an MEMS board with a higher dimensional precision than a glass epoxy board.

The board arrangement structure includes a housing, a first board fastened to the housing, a second board arranged in parallel enabling relative movement with respect to the first board, an electrically charged film, a counter electrode, and an output part outputting electric power generated between the electrically charged film and the counter electrode, at least one of the electrically charged film and the counter electrode being arranged at a first facing surface of the first board and the other being arranged at a second facing surface of the second board facing the first facing surface, and the first facing surface of the first board being fastened to a reference mounting surface provided at the housing.

The above board arrangement structure can reduce the variation in gap between the electret film and the counter electrode even if the processing precision of the component parts varies and suppress variation in the power generation capability of the electrostatic capacity type power generator using an electret film etc.

DESCRIPTION OF EMBODIMENTS

Below, referring to the figures, embodiments of the present invention will be explained. In the embodiments, parts of the same configuration are assigned the same reference notations and their explanations are omitted.

First Embodiment

Figure 4:
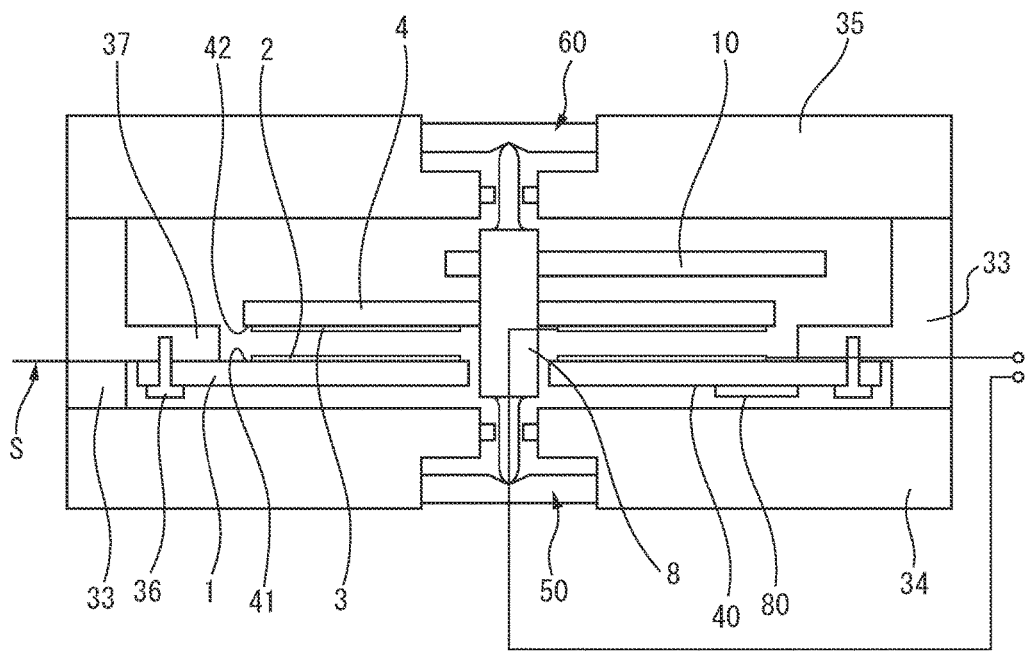
FIG. 4 is a schematic cross-sectional view showing a first embodiment of the present invention.
Figure 5:
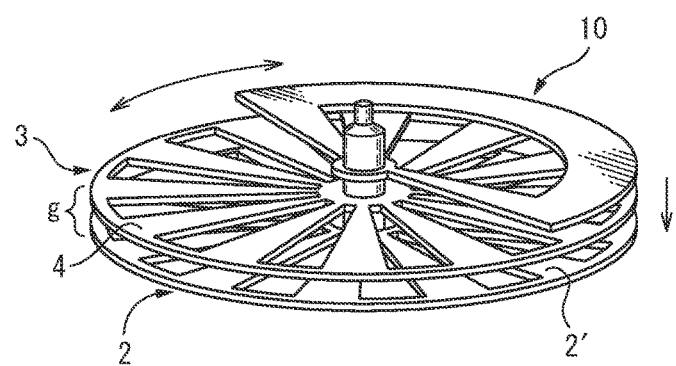
FIG. 5 is a perspective view showing a configuration of an electrically charged film and counter electrode in the case where a shaft of the first embodiment of the present invention has a rotor.
Figure 6:
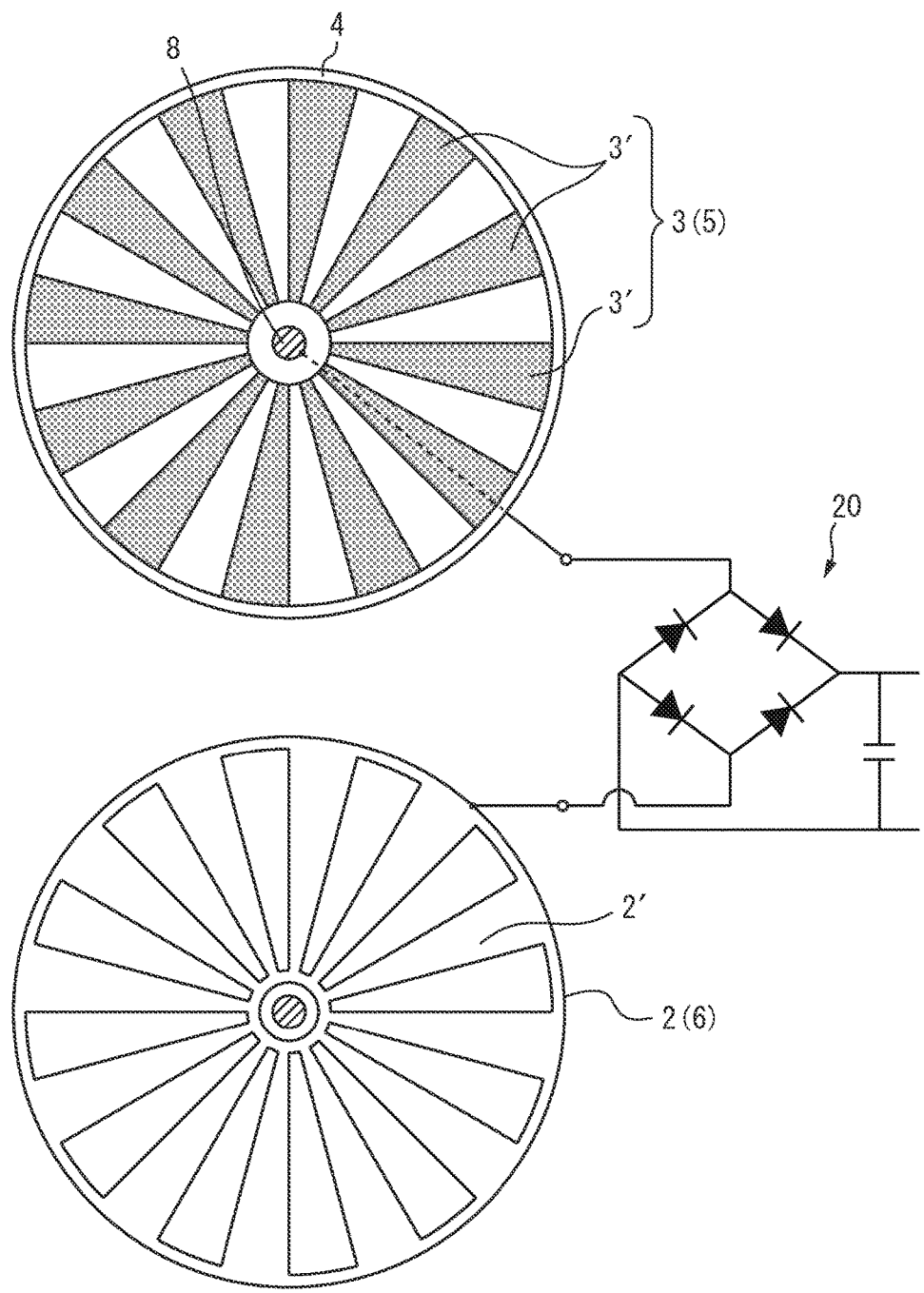
FIG. 6 is a view showing a pattern of a counter electrode 2 and an electrically charged film 3 of the first embodiment of the present invention.

FIG. 4 is a schematic cross-sectional view showing a first embodiment. FIG. 5 is a perspective view showing the configuration of the electrically charged film and counter electrode in the case of provision of a rotor at the shaft of the present embodiment. FIG. 6 is a view showing a pattern of the first counter electrode 2 and first electrically charged film 3 of the present embodiment.

The present embodiment can mainly be applied to a wristwatch or a portable electronic/electrical apparatus etc, but is not limited to this. The housing will be explained by terms often used in the case of wristwatches, that is, the main plate 33 and lower and upper bridges (or plates) 34 and 35, but the housing is not necessarily limited to a wristwatch and includes general housings of portable electronic/electrical apparatuses etc. The lower and upper bridges 34 and 35 have lower and upper bearing parts 50 and 60 fit into them and assembled by screws etc. The main plate shown in FIG. 4 is formed into a simple cylindrical shape, but the invention is not limited to this. Any support in the housing of PLT 2 to which various parts are assembled will be referred to as a "main plate" here.

Referring to FIG. 4, at the inner circumferential side of the main plate 33, a mounting part 37 provided for fastening the first board 1 by bolts 36 etc. is provided. In the present embodiment, a reference mounting surface S for surface contact with the first facing surface 41, at which the counter electrode 2 of the first board 1 is set, is formed at the bottom surface of the mounting part 37. This reference mounting surface S functions as a reference for positioning. This point will be explained later. The mounting part 37 may be set in a ring shape at the entire inner circumference or may be set in the form of several projecting shapes at predetermined positions of the inner circumference. "Top" and "bottom" indicate top and bottom on the surface of FIG. 4. In the present embodiment, the top surface of the first board 1 is the first facing surface 41 where the counter electrode 2 is provided. The second board 4 is fastened to the shaft 8. At the top and bottom of the shaft 8, tenons 8' (see FIG. 7) are set. The top and bottom tenons 8' and 8' are supported at the upper bearing part 60 and the lower bearing part 50 to be able to rotate. The bottom surface of the second board 4 is the second facing surface 42 where the electrically charged film 3 is set. The second board 4 is driven to rotate by a later explained rotation driving means so as to rotate about the shaft 8.

In the above explanation, the case was explained where the counter electrode 2 was set at the first board 1 and the electrically charged film 3 was set at the second facing surface 42 of the rotating second board 4, but the invention is not limited to this. The electrically charged film and counter electrode may also be attached to the boards in a reverse manner to set the electrically charged film 3 at the first facing surface 41 of the first board 1 and set the counter electrode 2 at the second facing surface 42 of the second board 4.

For the electret material able to be used as the electrically charged film at the present invention, an easily chargeable material is used. For example, as a minus charging material, silicon oxide ($SiO_2$), a fluororesin material, etc. is used. Specifically, as one example, as a minus charging material, there are a fluororesin material CYTOP (registered trademark, perfluorinated polymer) made by Asahi Glass etc.

Further, in addition, as the electret material, there are a polymer material comprised of polypropylene (PP), polyethylene terephthalate (PET), polyvinyl chloride (PVC), polystyrene (PS), polytetrafluoroethylene (PTFE), polyvinylidene fluoride (PVDF), polyvinyl fluoride (PVF), etc. As an inorganic material, the above-mentioned silicon oxide ($SiO_2$), silicon nitride (SiN), etc. can also be used. In addition, a known electrically charged film can be used.

At the inside surface of the electrically charged film 3 (electret film), a negative charge is held, so at the counter electrode 2, a positive charge is attracted by electrostatic induction. The counter electrode 2 provided at the first board 1 and the electrically charged film 3 provided at the second board 4 are patterns such as shown in FIG. 6 formed with radiating parts 2', 3' of equal angles at equal intervals about the center. The electrically charged film 3 is formed into a pattern comprised of the individual radiating parts 3', which are connected to the shaft 8 of the conductive member through electrical contacts for output (individual radiating parts 3' may be connected to the shaft 8 or individual radiating parts 3' may be connected to the shaft 8 after being wired together). When the second board 4 is a metal, the individual radiating parts 3' are directly connected to the shaft 8 through the board. On the other hand, at the counter electrode 2 as well, output is taken out from the electrode part at the outer circumferential side. The two output terminals are connected to a rectifier circuit 20. For the method of taking out current from the shaft 8, electrical connection while rotating utilizing brush electrodes or conductor components of bearing parts may be performed. Further, in the case of PLT 3 where sympathetic vibration is caused by a hairspring (see spiral spring etc. in paragraph 0038 of PLT 3), electrical connection from the shaft 8 made of the conductive member through the hairspring of a conductor (the hairspring is arranged between shaft 8 and main plate) is possible.

When a rotation driving means makes the second board 4 fastened to the shaft 8 rotate, the overlapping area of the electret film 3 and counter electrode 2 changes, the positive charge attracted at the counter electrode 2 changes, and an AC current is generated at the electret film and counter electrode. The current between the counter electrode 2 and the electrically charged film 3 is passed through the rectifier circuit 20 as the output part to be converted to direct current and is taken out to the outside for generation of power.

The rectifier circuit 20 is a bridge type. It is provided with four diodes. At the input side, the counter electrode 2 and the electrically charged film 3 are connected. At the output side, it is connected to an outside output through a smoothing circuit. The electrically charged film 3 and counter electrode 2 in the present embodiment were patterned into radial shapes, but so long as the superposed area of the first and second boards 4 changes at the time of relative rotation, other shapes may also be formed by patterning.

As one example of another pattern, unlike the pattern shown at the bottom part of FIG. 6, the radiating parts 2' of the counter electrode 2 on the first board 1 are made respectively independent. The intermittently wired radiating parts 2' (two terminals) may also be respectively connected to the input side of the rectifier circuit 20 (Japanese Unexamined Patent Publication No. 2013-135544A incorporated by reference. See embodiment of FIGS. 9 and 10 of this publication. In this case, it is sufficient to take out current from only the counter electrode 2 on the stationary first board 1, so electrical connection of the rotating second board 4 becomes unnecessary. This is convenient.)

In the present embodiment, in electret power generation, the generated voltage is high, but the generated current is small, so if the distance to the rectifier circuit 20 is long, the stray capacitance generated at the board etc. causes the power generation efficiency to end up decreasing. For this reason, it is preferable to provide at least the electronic circuit 80 relating to power generation at the first board 1 of the power generation electrode. However, if providing the electronic circuit 80 at the power generation board surface, that is, the first facing surface, the board ends up becoming larger in diametrical direction. For this reason, by providing the electronic circuit 80 (including at least the rectifier circuit) at the back surface 40 of the board at which the counter electrode 2 is not provided, it is possible to make effective use of space and keep down the increase in the diametrical direction. There are good points even if providing the electronic circuit 80 at the back surface 40 in the same way in the following embodiments as well. Here, the electronic circuit 80 includes a diode bridge, capacitor, IC, etc., but it is enough if at least a diode bridge circuit is included. If possible to provide just the minimum limit diode bridge circuit, the distance between the power generator and the rectifier circuit can be shortened, so the loss at the time of power generation can be reduced and the power generation efficiency also rises.

Next, the first facing surface 41 of the first board 1 where the counter electrode 2 is set and the reference mounting surface S coming into surface contact with the same will be explained.

As shown in the prior art, when placing the first board 1 at the lower housing 34 and generating power between the counter electrode 2 provided at the first facing surface 41 of the top surface of the first board 1, and the electrically charged film 3 of the second facing surface 42 of the second board 4, the thickness of the electrically charged film 3 or the counter electrode 2 itself becomes several microns or so at most, so the effect of the variation in thickness of the first board itself ends up becoming extremely great. If using an inexpensive glass epoxy board, the glass epoxy board ends up varying by about 100μ (thickness tolerance). This variation ends up becoming a large variation in the amount of power generation when controlling the electrically charged film-counter electrode gap "g" to 100μ or less, so this was a part becoming a large bottleneck for obtaining a stable amount of power generation of the product.

Figure 1:
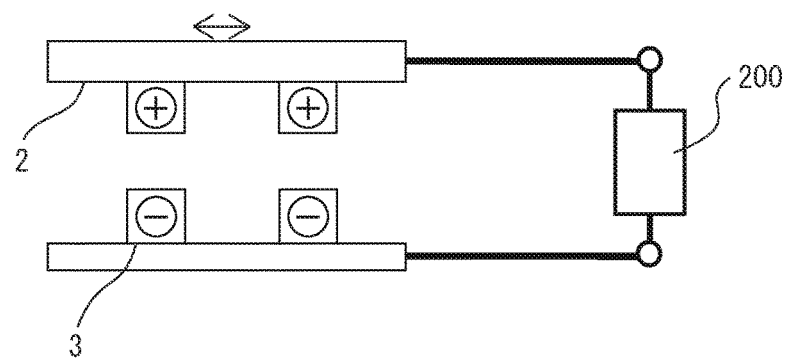
FIG. 1 is an explanatory view explaining the principle of power generation utilizing the electrostatic induction phenomenon.
Figure 2:
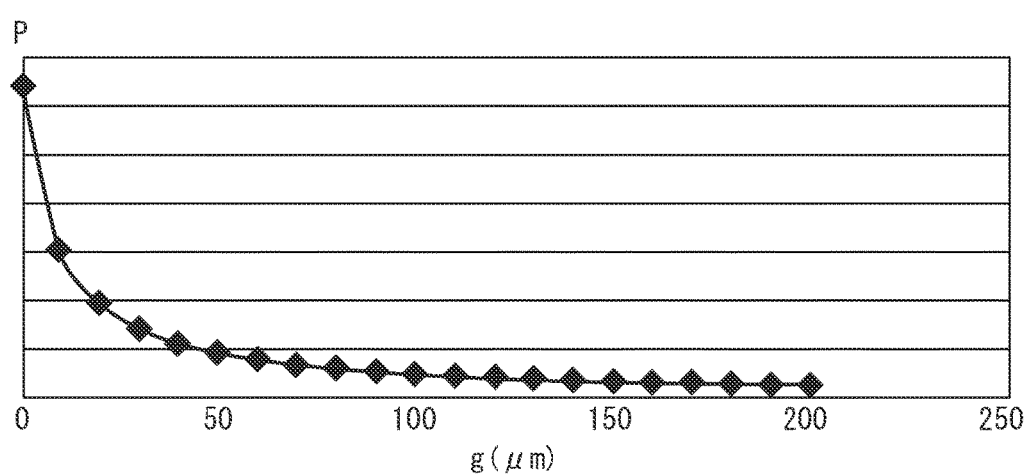
FIG. 2 is a graph showing the relationship between an electrically charged film-counter electrode gap "g" and an amount of power generation.
Figure 3:
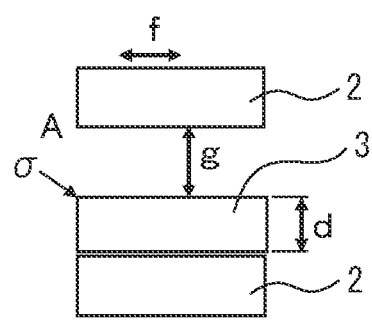
FIG. 3 is an explanatory view explaining a load matched power equation showing the relationship between an electrically charged film-counter electrode gap "g" and an amount of power generation.

In the present embodiment, by attaching the first facing surface 41 of the first board 1 at which the counter electrode 2 is set on the bottom surface of the mounting part 37 of the main plate 33 (reference mounting surface S), it is possible to eliminate the effect of variation in thickness of the board itself. The thicknesses of the coating films of the counter electrode 2 and the electrically charged film 3 themselves are about several microns, so the reference mounting surface S (that is, the first facing surface 41) and the second facing surface 42 of the second board 4 show the electrically charged film-counter electrode gap "g". This reference mounting surface S functions as a reference for positioning. The first board 1 has a part striking the bottom surface of the mounting part 37 of the main plate 33 as the reference surface of the first board 1, so the counter electrode 2 provided on the board can be always positioned at the reference surface S even if the thickness of the board changes and the effects on the gap "g" of the variation in thickness of the board can be eliminated. Therefore, as shown in FIG. 2, the closer the gap "g" to zero, the greater the amount of power generation that can be obtained by electret power generation and the more completely the effect of the variation of thickness of the board itself can be eliminated, so it is sufficiently possible to control the electrically charged film-counter electrode gap "g" to 100μ or less.

Figure 7:
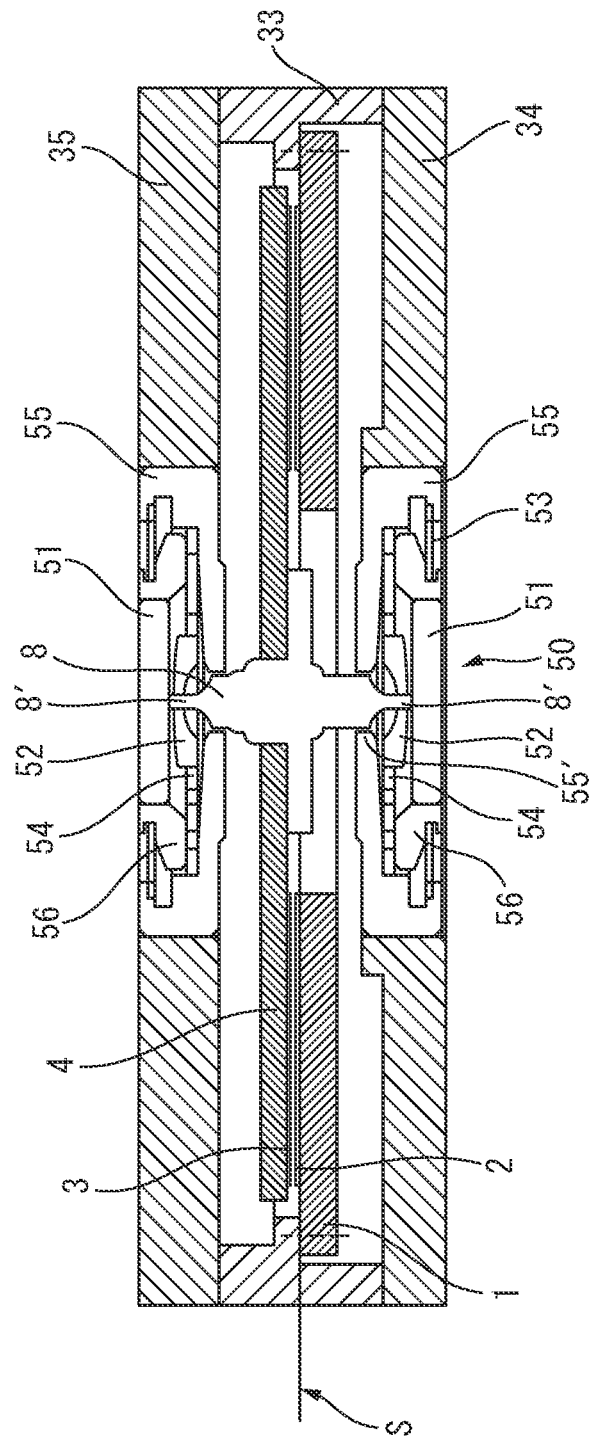
FIG. 7 is a detailed cross-sectional view showing the first embodiment of the present invention.
Figure 8:
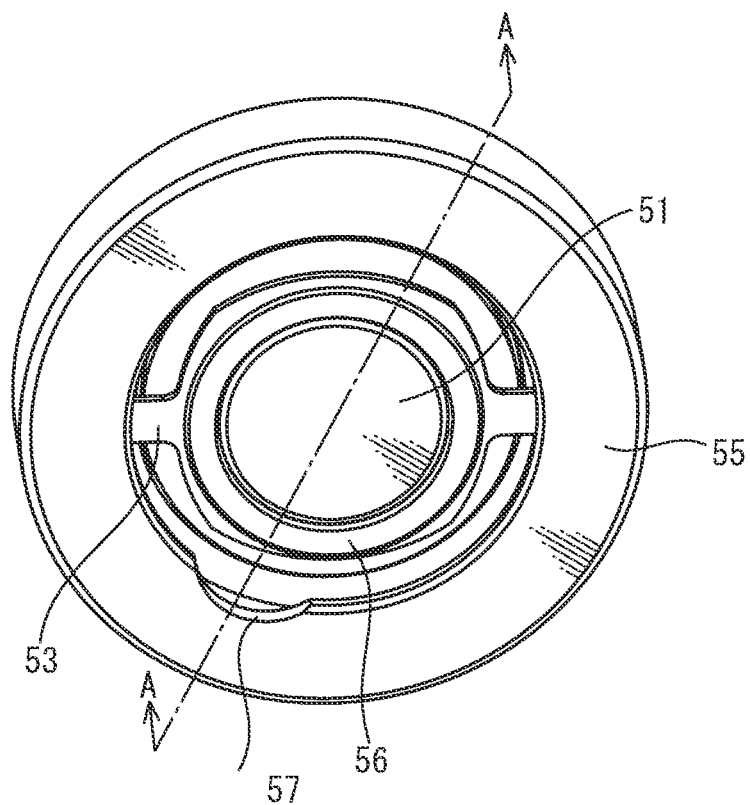
FIG. 8 is a perspective view of a lower bearing part of the first embodiment of the present invention seen from below.
Figure 9:
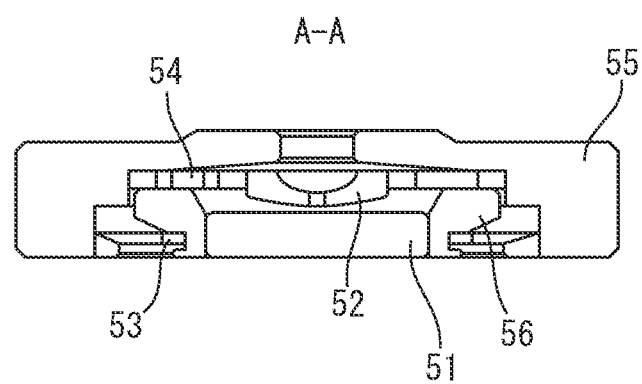
FIG. 9 is a cross-sectional view along the line A-A of FIG. 8.
Figure 10:
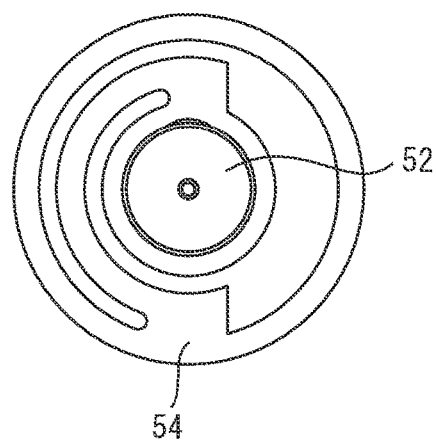
FIG. 10 is a plan view of a spiral spring part.

FIG. 7 is a detailed cross-sectional view showing a first embodiment of the present invention. Note that, in FIG. 7, illustration of the rotor 10 and other parts is omitted. FIG. 8 is a perspective view of the lower bearing part of the first embodiment of the present invention seen from below. FIG. 9 is a cross-sectional view along the line A-A of FIG. 8. FIG. 10 is a plan view of a spiral spring part.

In the present embodiment, the point that the second board 4 is supported by the upper bearing part 60 and the lower bearing part 50 to be able to rotate will be explained below. The upper bearing part 60 and the lower bearing part 50 form a shock protection system. The top and bottom are comprised of the same members, so the lower bearing part 50 will be explained. In the following explanation, a shock protection system known as a "parashock" used for a mechanical watch will be explained, but the bearing part is not limited to this. Another known shock protection system may also be utilized.

The lower bearing part 50 shown in FIG. 8 holds a jewel seat 56 at the outside frame 55. The jewel seat 56 is supported by two spring pieces 53 at the two sides by insertion of the depressed part 57 at the inside of the frame. As shown in FIG. 9, at the bottom surface of the inside of the frame 55, the outer circumferential side of the flat plate-shaped spiral spring 54 shown in FIG. 10 is held so as to clamp the bottom surface of the jewel seat 56 (here, the upper side surface in the drawing of FIG. 9). As shown in FIG. 10, at the spiral spring 54, a jewel 52 is integrally connected at the inner circumference part. The end face of the tenon 8' of the shaft 8 is axially supported by a jewel 51 fit inside the jewel seat 56. This situation is shown in detail in the cross-sectional view of FIG. 9. The lower bearing part 50 and the upper bearing part 60 are respectively fit in the lower bridge 34 and upper bridge 35 etc. to fasten them without loosening of the shaft 8.

In the lower bearing of the shock prevention system, the shock load in the radial direction of the shaft 8 is received by the spiral spring 54 and the inside diameter part 55' of the frame 55, while the load in the axial direction is received by the spring pieces 53. The jewel 52 and the jewel 51 are often made by rubies, but either may be an abrasion resistant metal material as well. When an axial direction force is applied to the rotating second board 4, if precisely positioning the second board 4 in the axial direction of the bearing part at the side receiving the force (for example, the lower bearing part 50), since the position of the first facing surface 41 is accurately set by the reference mounting surface S, the electrically charged film-counter electrode gap "g" can be precisely set. Normally, a Coulomb's force (attraction) acts between the electrically charged film and counter electrode, so the lower bearing can be positioned precisely.

Next, the rotational drive of the present embodiment will be explained. As seen in FIG. 4, in the present embodiment, a rotor 10 having an uneven weight balance is directly set at the shaft 8. The rotor 10 is driven due to walking or other motion of the human body. Note that, instead of directly attaching the rotor 10 to the shaft 8, it is also possible to attach a weight to the second board 4 and make the second board 4 itself the rotor 10.

For driving rotation of the shaft 8 of the second board 4, it is possible to employ not only rotation of the rotor fastened to the shaft 8, but also the arts of driving rotation of known self-winding mechanisms used for mechanical type wristwatches in the past. For example, in PLT 2, it is possible to accelerate rotation of a rotor separately supported from the shaft 8 through a gear mechanism to drive the shaft 8 and enable relative rotation between the electret film and electrode. If always converting rotation of the rotor axially supported separate from the shaft 8 (this shaft being referred to as the "rotor shaft" below) in the forward and reverse directions to rotation in one direction, the power generation efficiency can be further enhanced.

Such a conversion clutch mechanism is well known as known art as a "two-way clutch mechanism" in self-winding wristwatches, so it is possible apply these known arts etc. Further, it is also possible to transmit only one of the forward and reverse directions of rotation or rocking of the rotor shaft to the shaft 8. For example, it is possible to use a switching gear, two gears, a link or cam and connecting mechanism etc. to transmit rotation in both the front and reverse directions or only one direction of rotation of the front and reverse directions to the second board 4 always in one direction. The waste of the kinetic energy when rotation of the shaft 8 of the second board 4 rotates in reverse is eliminated and the power generation efficiency can be raised. In addition, as seen in PLT 3, it is also possible to utilize the sympathetic vibration phenomenon for the rotational vibration of the shaft 8 and increase the amplitude to raise the power generation efficiency. The rotational drive of the above first embodiment is similar in the second to sixth embodiments explained below as well.

Second Embodiment

Figure 11:
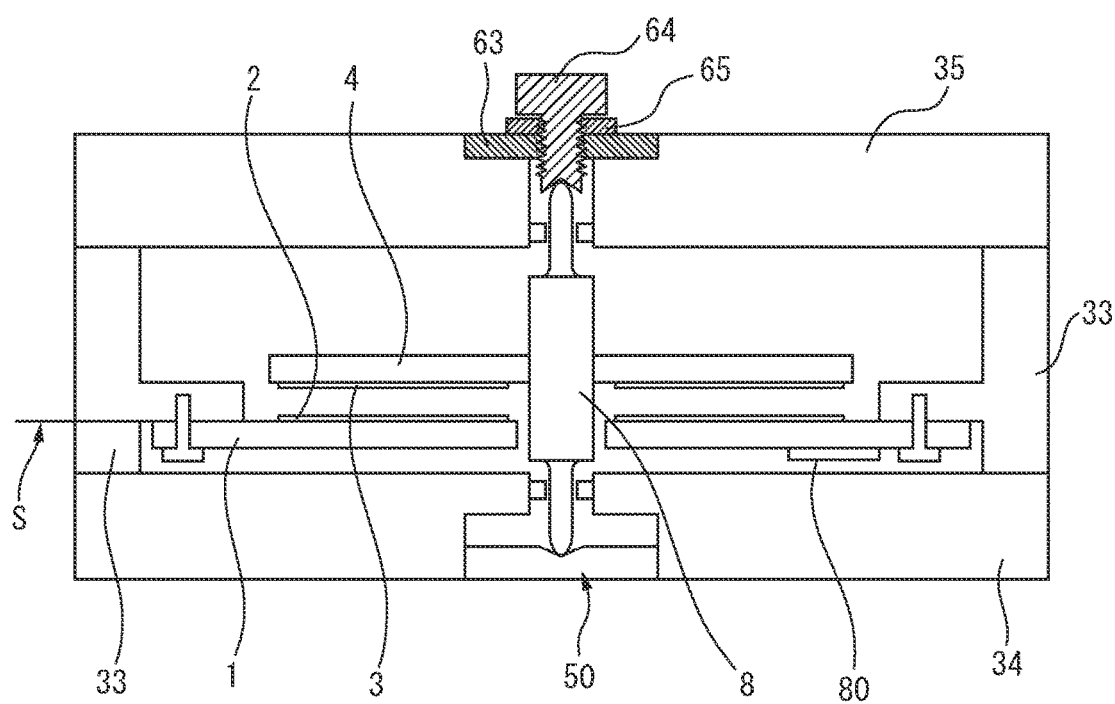
FIG. 11 is a schematic cross-sectional view showing a second embodiment of the present invention.
Figure 12:
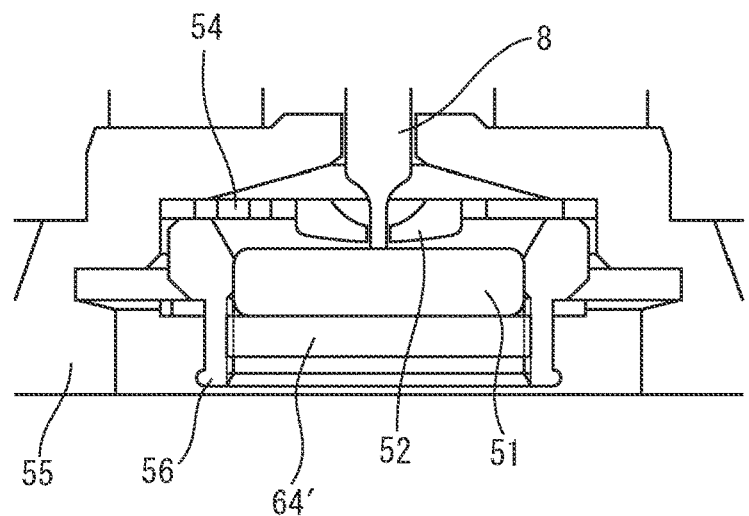
FIG. 12 is a partial cross-sectional view showing an adjustment mechanism of the second embodiment of the present invention.
Figure 13:
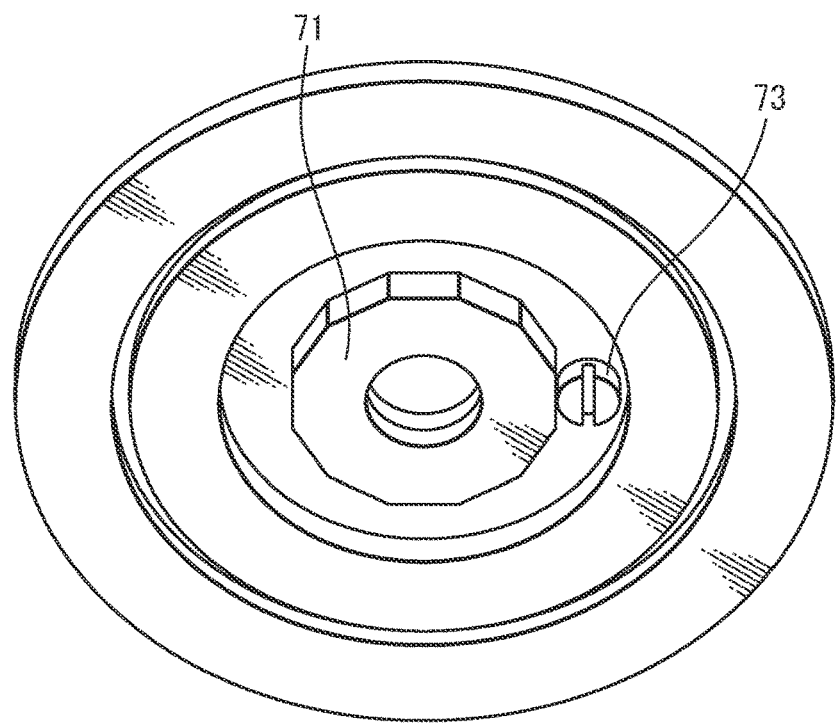
FIG. 13 is a perspective view of the adjustment mechanism of the second embodiment of the present invention seen from below.
Figure 14:
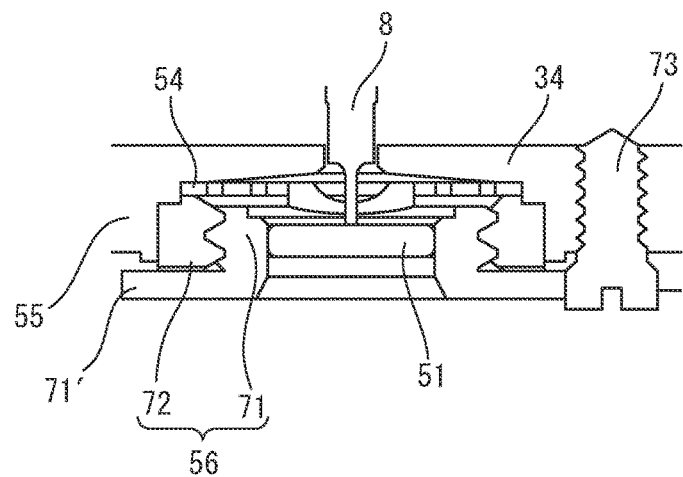
FIG. 14 is a partial cross-sectional view showing an adjustment mechanism of FIG. 13.

FIG. 11 is a schematic cross-sectional view showing a second embodiment of the present invention. FIG. 12 is a partial cross-sectional view showing an adjustment mechanism of the second embodiment of the present invention. FIG. 13 is a perspective view of the adjustment mechanism of the second embodiment of the present invention seen from below. FIG. 14 is a partial cross-sectional view showing the adjustment mechanism of FIG. 13.

In the above first embodiment, as shown in FIG. 7, the lower bearing part 50 and the upper bearing part 60 were fastened by respectively being fit in the lower bridge 34 and upper bridge 35. If loosening occurs between the front ends of the tenons 8' of the shaft 8 and the bearing parts 50 and 60, as shown schematically in FIG. 11 (in the following embodiment, illustration of rotor 10 not shown), it is possible to adjust one of the bearings by the adjustment mechanism (receiving screw 64 etc.) to thereby reduce the loosening of the shaft 8. Note that, the specific constitutions of the receiving screw 64 and fastening screw 65 are shown in the later explained upper bearing part 60 of FIG. 16. Details will be explained later.

Due to this, not only is it possible to block the effect of variation in thickness of the first board 1, but it is also possible to use an adjustment mechanism to adjust one of the bearings, so it is possible to precisely set the electrically charged film-counter electrode gap "g" more precisely than the past. Further, since it is possible to reduce the loosening of the shaft 8, it is possible to eliminate the effects of changes of posture of the shaft 8 and obtain a stable amount of power generation. In the support plate 63 fit with the upper bridge 35, a receiving screw 64 is screwed in to be adjustable in the axial direction. Further, the receiving screw 64 is preferably stopped from loosening by a fastening screw 65 (double nut) so as to prevent loosening due to shock, vibration, etc., but this embodiment can be worked even without a fastening screw 65. The rest of the configuration other than the bearing part is the same as the first embodiment.

When using an adjustment mechanism to enable adjustment of one of the bearings, various means may be used to prevent loosening of the shaft 8 other than the above double nut. As shown in FIG. 12, in either parashock of the lower bearing part 50 and upper bearing part 60 shown in FIG. 7, the jewel 51 inserted inside of the jewel seat 56 may be made to adjust the loosening of the shaft 8 by a receiving screw 64'. The outer circumference of the receiving screw 64 is cut with a male thread. Inside of the jewel seat 56, a female thread is cut. The receiving screw 64' is screwed in to adjust the loosening of the shaft 8. The frames 55 of the lower bearing part 50 and upper bearing part 60 are fastened by respectively fitting them in the lower bridge 34 and upper bridge 35. In the example of FIG. 12, as an adjustment mechanism, a receiving screw 64 is provided at only the lower bearing part 50, but it is also possible to provide this only at the upper bearing part 60. Due to this, it is possible to reduced the loosening of the shaft 8 and obtain a stable amount of power generation without being affected by the change of the posture. Note that, as explained later, in the third embodiment, it is also possible to provide the above receiving screws 64' at both of the lower bearing part 50 and upper bearing part 60.

The adjustment mechanism using a screw also includes the type shown in FIGS. 13 and 14. In this case, in the parashock of either of the lower bearing part 50 and upper bearing part 60, the jewel seat 56 is comprised of the outside jewel seat 72 with a female thread cut into it at the inner circumference side and an inside jewel seat 71 with a male thread cut into it at the outer circumference side. The inside of the inside jewel seat 71, as shown in FIG. 7, is the same in structure at the lower bearing part 50 and the upper bearing part 60. That is, at the inside bottom surface of the frame 55, the outer circumference side of the spiral spring 54 shown in FIG. 14 is held so as to be clamped by the bottom surface of the outside jewel seat 72. At the spiral spring 54, the jewel 52 is integrally connected with the inner circumferential part. The end face of the tenon 8' of the shaft 8 is axially supported by the jewel 51 fit inside the inside jewel seat 71. The male thread of the outer circumferential side of the inside jewel seat 71 is screwed into the female thread at the inner circumference of the outside jewel seat 72 to be able to be finely adjusted in position in the axial direction of the shaft 8.

The flange part 71' of the inside jewel seat 71 is formed into a 12-sided shape in the present embodiment. As seen in FIG. 13, the setscrew 73 is engaged with one side of the flange part 71' to stop rotation of the inside jewel seat 71. Due to this, the inside jewel seat 71 is kept from changing from the state adjusted so that shock, vibration, etc. were kept from causing loosening and the shaft 8 was kept from loosening. Note that, the frames of the lower bearing part 50 and upper bearing part 60 are respectively fastened by being fit in the lower bridge 34 and upper bridge 35 etc. The rest of the configuration beside the bearing parts is the same as the first embodiment. Due to this, it is possible to reduce the loosening of the shaft 8 and obtain a stable amount of power generation without being affected by changes in posture.

Third Embodiment

Figure 15:
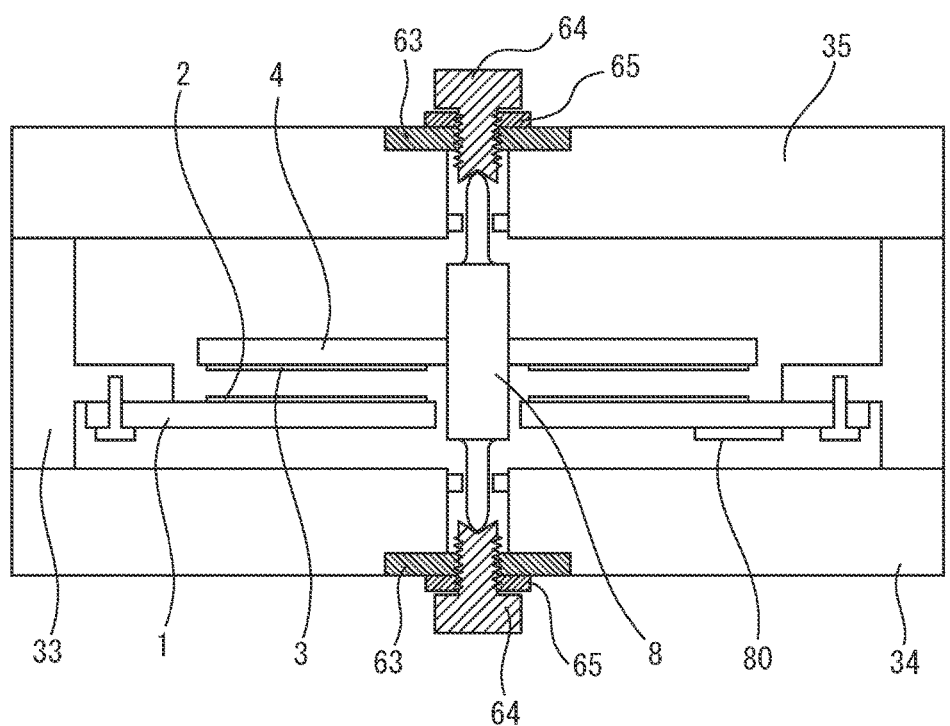
FIG. 15 is a schematic cross-sectional view showing a third embodiment of the present invention.
Figure 16:
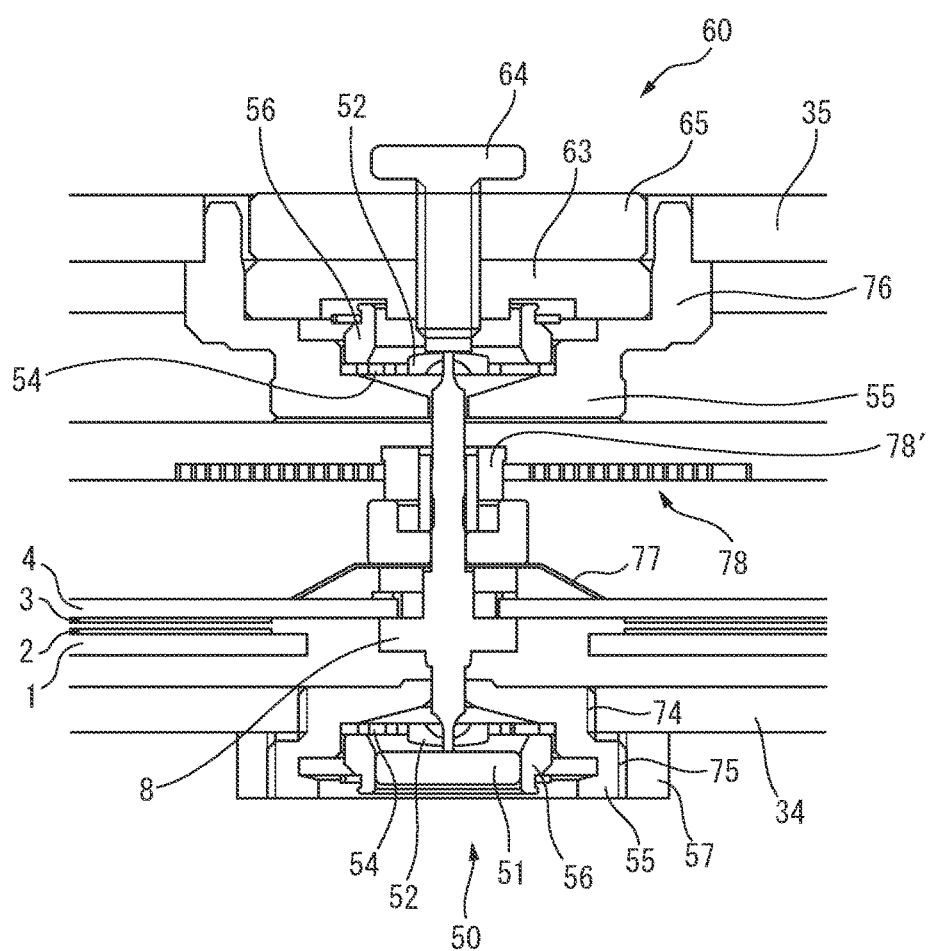
FIG. 16 is a cross-sectional view showing an adjustment mechanism of the third embodiment of the present invention.

FIG. 15 is a schematic cross-sectional view showing a third embodiment of the present invention. FIG. 16 is a cross-sectional view showing an adjustment mechanism of a third embodiment of the present invention.

As schematically shown in FIG. 15, this is an embodiment designed to use adjustment mechanisms (receiving screw 64 etc.) to adjust both the lower bearing part 50 and upper bearing part 60. Due to this, loosening of the shaft 8 can be reduced. Further, by providing adjustment mechanisms at the top and bottom, it is possible to change the axial direction position of the rotating second board 4 with respect to the stationary first board 1. The embodiment can make the electrically charged film-counter electrode gap "g" reliably accurately match a predetermined position. In the present embodiment, it is possible to realize the initially designed electrically charged film-counter electrode gap "g" by the actually assembled power generator by providing adjustment mechanisms at the top and bottom, so it is possible to obtain the maximum power generation ability.

For the adjustment mechanisms of the lower bearing part 50 and upper bearing part 60, it is possible to use all of the adjustment mechanisms explained in the second embodiment. The adjustment mechanisms of the lower bearing, part 50 and upper bearing part 60 may be the same mechanisms at the top and bottom or may be different. Referring to FIG. 16, one example of the third embodiment will be explained. The present embodiment provides both the lower bearing part 50 and upper bearing part 60 with adjustment mechanisms using screws and uses double nuts for stopping loosening. First, the explanation will be given from the lower bearing part 50.

In this case, in the parashock of the lower bearing part 50, a small diameter thread part 74 and a large diameter thread part 75 are formed at the outer circumference of the frame 55. The small diameter thread part 74 is screwed into a female thread provided in the lower bridge 34. The screw in position of the small diameter thread part 74 is set so as to give a predetermined electrically charged film-counter electrode gap "g". After the end of adjustment, the upper nut 57 used as the double nut (lower nut in FIG. 16) is screwed in until contacting the lower bridge 34 to stop loosening. The jewel seat 56 and the inside structure are the same as the parashock of the lower bearing part 50 shown in FIG. 7.

On the other hand, in the adjustment mechanism of the upper bearing part 60, as shown in FIG. 16, the upper frame 76 is integrally connected with the top part of the frame 55. The outer circumference of the upper frame 76 is fastened by being fit in the upper bridge 35. The support plate 63 is inserted fit in the inner circumference of the upper frame 76, while the receiving screw 64 is screwed in to be adjustable in the axial direction. The bottom end face of the receiving screw 64 performs the same function as a jewel. Inside of the frame 55, in the same way as FIG. 8, a jewel seat 56 is housed. Except for the lack of the jewel 51 and corresponding to the bottom end face of the receiving screw 64, the structure is the same as the structure of the parashock explained above.

In one example of the third embodiment of FIG. 16, the configuration of the first board 1 and the second board 4 and the configuration of the rotational drive are partially omitted in FIG. 16, but are the same as in the first embodiment. In the present embodiment, at the shaft 8 of the second board 4, a hairspring 78 is provided (one end of the hairspring 78 fastened to the shaft. 8 by a hairspring collet 78' while the other end fastened to the housing). It has the configuration of the prior art of PLT 3. A plate spring 77 is used to fasten the second board 4 to the shaft 8.

In the third embodiment, in addition to the effect of the first and second embodiments, it is possible to provide adjustment mechanisms at the top and bottom to change the axial direction position of the rotating second board 4 with respect to the stationary first board 1 to reliably match the electrically charged film-counter electrode gap "g" accurately with a predetermined position.

Fourth Embodiment

Figure 17:
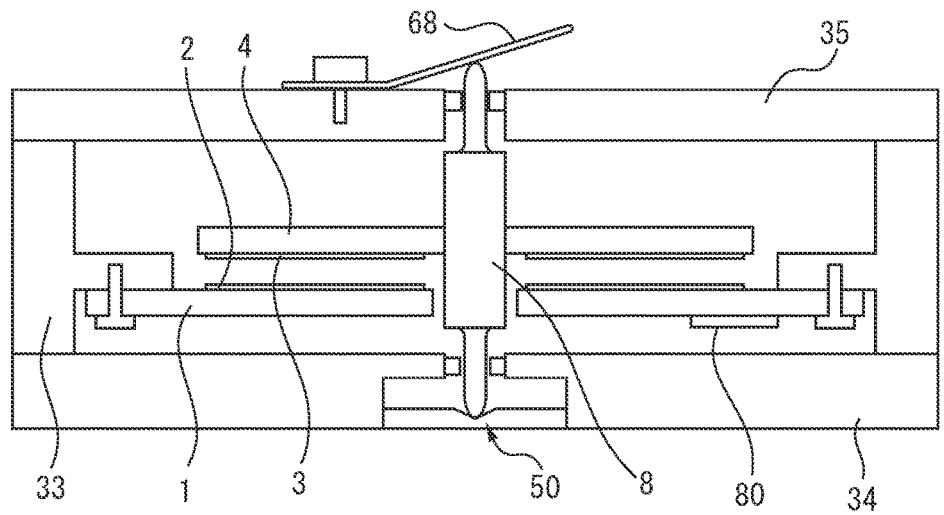
FIG. 17 is a cross-sectional view showing an adjustment mechanism of a fourth embodiment of the present invention.
Figure 18:
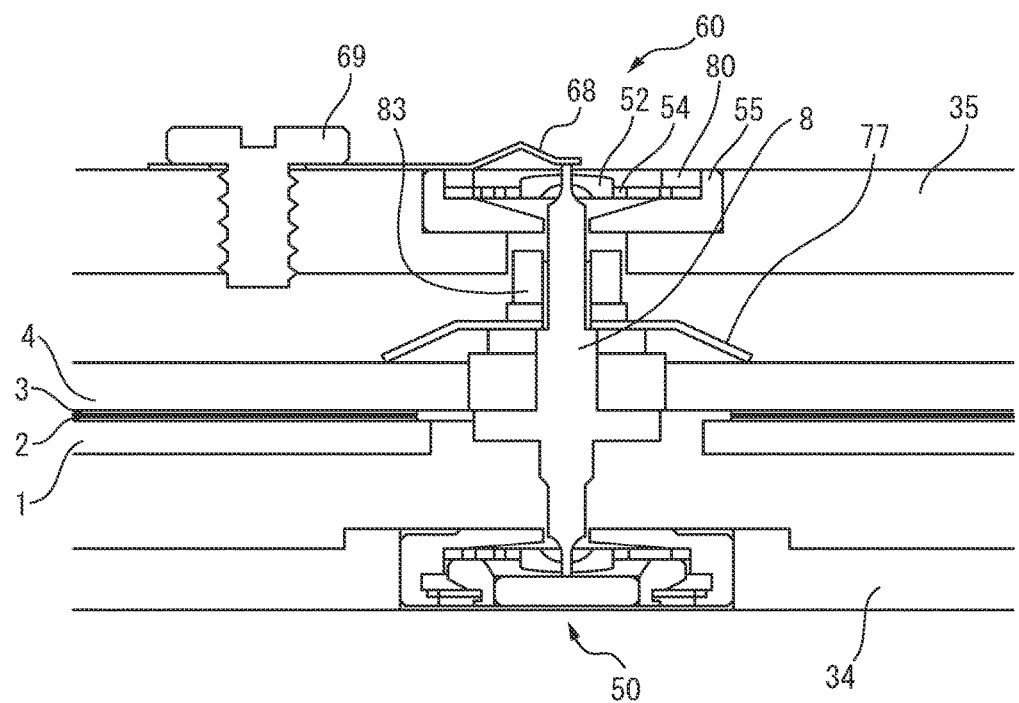
FIG. 18 is a cross-sectional view showing the fourth embodiment of the present invention.

FIG. 17 is a schematic cross-sectional view showing a fourth embodiment of the present invention. FIG. 18 is a cross-sectional view showing the fourth embodiment of the present invention.

As schematically shown in FIG. 17, this embodiment is comprised of the first embodiment where the lower bearing, part 50 is fastened by fitting it in the lower bridge 34 and, instead of the upper bearing part 60 of the first embodiment, a bearing part designed to push against the front end of the tenon 8' of the shaft 8 by a leaf spring 68 is used to axially support the top part of the shaft 8. By using a leaf spring 68 to push against. one of the bearings by a certain load, it is possible to eliminate the looseness of the shaft 8. Due to this, adjustment of positioning of the shaft 8 in the axial direction becomes simple. The electrically charged film-counter electrode gap "g" can be matched with a predetermined position based on the set position of the lower bearing part 50. A general shock protection system envisions strong shock. In normal use, the shock protection system is usually used in an unbent state (when using the shock protection system bent, the spring force (spring constant) is too strong and a load ends up being applied for rotation of the shaft 8). If illustrated by the parashock, the spring pieces 53 are not used bent. The leaf spring 68 of the present embodiment contacts the end face of the tenon of the shaft 8 in the state displaced from the no-load state, that is, the bent state, and is used to close the electrically charged film-counter electrode gap "g". The spring force (spring constant) of the leaf spring 68 is suitably adjusted to a weak magnitude by which no load is applied to the rotation of the shaft 8. A spring of a shock prevention system differs in state of bending at the time of normal use. Note that, here, a leaf spring 68 was used, but the invention is not limited to a leaf spring.

Details of the embodiment are shown in FIG. 18. The lower bearing part 50 is as explained in the first embodiment. The upper bearing part 60 is held so that the outer circumference side of the spiral spring 54 is clamped at the bottom surface of the inside of the frame 55 by the bottom surface of the holding seat 80. The spiral spring 54 has a jewel 52 connected integrally with it at its inner circumference. The top end face of the tenon 8' of the shaft 8 pushes one of the bearings by the leaf spring 68 by a certain load. The leaf spring 68 is fastened by a screw 69 at the upper bridge 35. In addition, the configuration of the first board 1 and second board 4 and the configuration of the rotational drive are the same as the first embodiment. The second board 4 is driven to rotate by a gear (not shown) meshed with a pinion 83.

Fifth Embodiment

Figure 19:
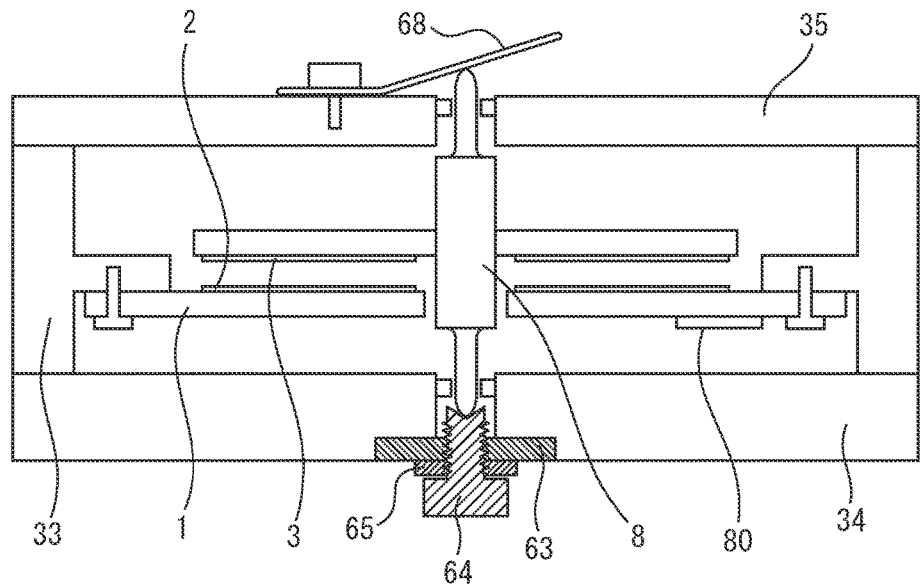
FIG. 19 is a schematic cross-sectional view showing a fifth embodiment of the present invention.

FIG. 19 is a schematic cross-sectional view showing a fifth embodiment of the present invention.

As shown schematically in FIG. 19, this is comprised of the fourth embodiment where the lower bearing part 50 is made one in which an adjustment mechanism (receiving screw 64 etc.) can be used to adjust the position of the bearing. As this adjustment mechanism, it is possible to apply all of the adjustment mechanisms using screws of the second embodiment. In addition to the effect explained in the first embodiment, it is possible to perform the positioning of the second board 4 relatively easily and adjust it simply and accurately. Due to this, loosening of the shaft 8 can be reduced, the effect of a change of posture can be eliminated, and a stable amount of power generation can be obtained.

Sixth Embodiment

Figure 20:
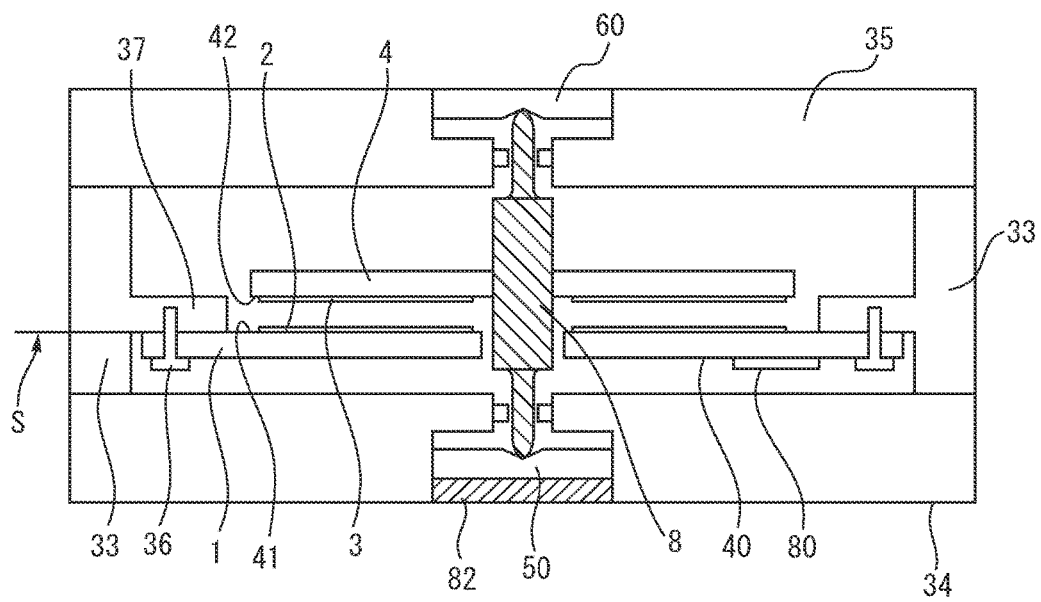
FIG. 20 is a schematic cross-sectional view showing a sixth embodiment of the present invention.

FIG. 20 is a schematic cross-sectional view showing a sixth embodiment of the present invention.

As schematically shown in FIG. 20, this is an embodiment comprised of the first embodiment where the shaft 8 is made a JIS-SK material (carbon tool steel, ISO-C70 to 120U) or other magnetic material and, further, a ferrite or neodymium magnet 82 is set at the lower side of the lower bearing part 50. A known material may be suitably employed for the magnetic material of the shaft 8 or the magnet 82. By adding the magnet 82 in this way and thereby enabling the magnetic shaft 8 to be pushed against the lower bearing part, loosening of the shaft 8 can be suppressed and, in addition to the effects explained in the first embodiment, the position of the second board 4 can be stabilized, so a stable amount of power generation can be obtained.

Seventh Embodiment

The seventh embodiment is an embodiment making the second board 4 perform translational motion. In the same way as FIG. 4 of the first embodiment, at the inner circumference side of the main plate 33, the mounting part 37 provided for fastening the first board 1 by bolts 36 etc. is provided. A reference mounting surface S coming into surface contact with the first facing surface 41 at which the counter electrode 2 of the first board 1 is set is formed at the bottom surface of the mounting part 37. This reference mounting surface S functions as the reference for positioning. The top surface of the first board 1 is the first facing, surface 41 and is provided with the counter electrode 2 the second board 4 is configured so as to engage in translational motion with respect to the housing by a slider crank mechanism etc. Due to this, in the same way as the first embodiment, it is possible to completely eliminate the effects of variations in thickness of the board itself, so it becomes sufficiently possible control the electrically charged film-counter electrode gap "g" to 100μ or less. The electrically charged film and the counter electrode may also be set on the boards in reverse.

In the above second to sixth embodiments, the first facing surface side of the first board 1 of the first embodiment was explained as being fastened to the reference mounting surface S provided at the housing, but the second to sixth embodiments can be worked without being necessarily limited to this. That is, they may provide a board arrangement structure mechanism comprising a housing, a first board 1 fastened to the housing, a second board 4 arranged in parallel to the first board 1 to be able to relatively move, an electrically charged film 3, a counter electrode 2, and an output part outputting electric power generated between the electrically charged film and counter electrode, in which one of the electrically charged film 3 and counter electrode 2 is arranged at the first facing surface 41 of the first board 1, the other is arranged at the second facing surface 42 of the second board 4 facing the first facing surface 41, a shaft 8 is provided at the second board 4, and the shaft 8 is axially supported between the upper bearing part 60 and lower bearing part 50 provided at the housing to be able to rotate (this being called the "Constituent A"), wherein one or both of the upper bearing part 60 and the lower bearing part 50 have an adjustment mechanism adjusting the axial direction position of the shaft 8. Alternatively, in the Constituent A, there may be provided a board arrangement structure further comprising a biasing mechanism (spring or magnet) biasing the shaft 8 to one of the bearing parts of the upper bearing part 60 and the lower bearing part 50. Due to this, the effects of the adjustment mechanisms similar to those explained in the second to sixth embodiments are obtained.

Eighth Embodiment

Figure 21:
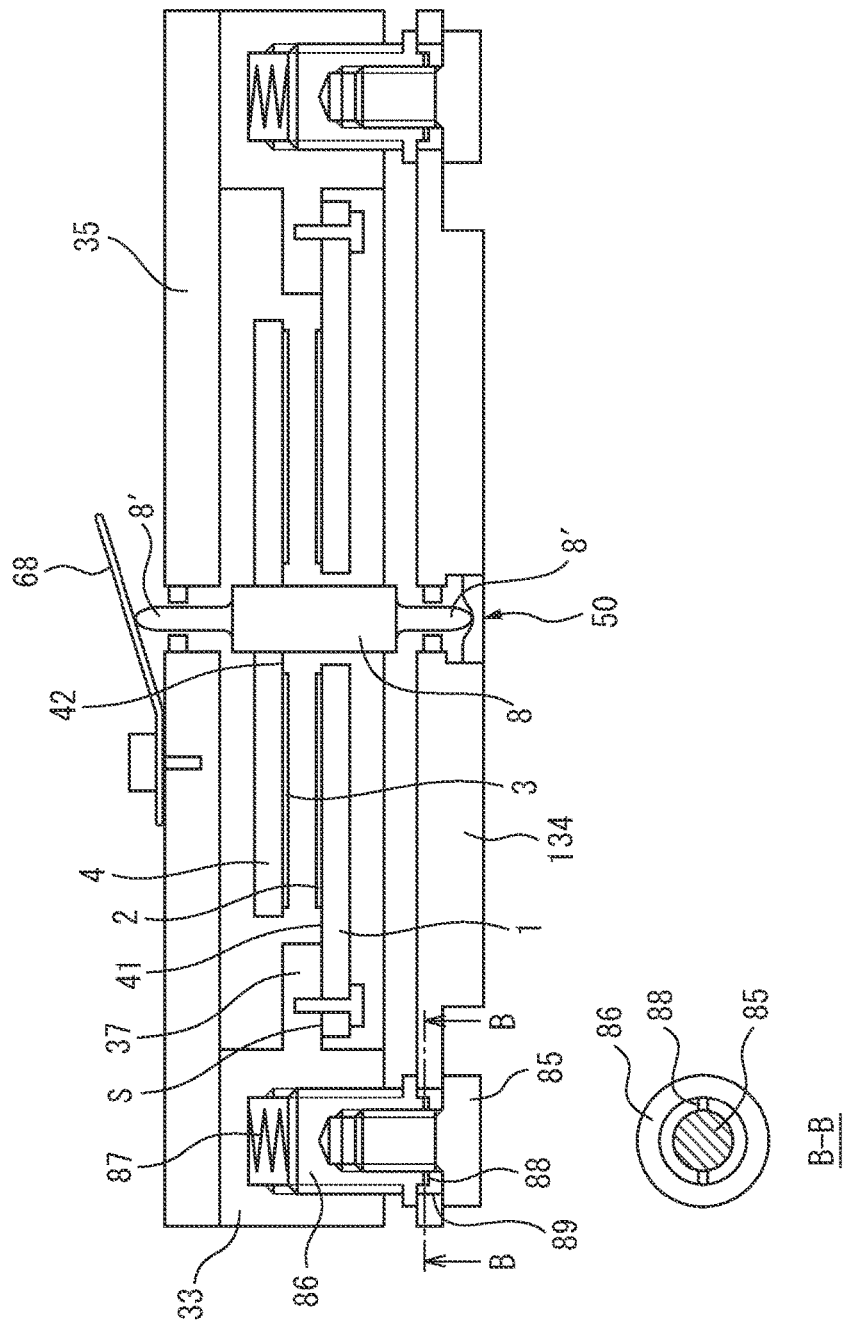
FIG. 21 is a schematic cross-sectional view showing an eighth embodiment of the present invention and a cross-sectional view along the line B-B.

FIG. 21 is a schematic cross-sectional view showing an eighth embodiment of the present invention. At the bottom left of the figure, a cross-sectional view relating to line B-B showing a screwed state of the position adjusting screw 86 and holding bolt 85 is shown.

In the eighth embodiment, instead of the adjustment mechanism (receiving screw 64) of the lower bearing part 50 of the fifth embodiment of FIG. 19, the lower bridge 134 itself can be adjusted in position in the axial direction of the shaft 8. The housing, in the present embodiment, is comprised of a main plate 33 and lower and upper bridges 134 and 35. Among these, the lower bridge 134 corresponds to the first housing part, while the main plate 33 and upper bridge 35 correspond to the second housing part. The main plate 33 of FIG. 21 can be replaced by a support column at least at one location. In this case, preferably support columns are provided at two or more locations, and the shaft of the rotating second board 4 (rotating member) is stable and it is possible to stably set the gap between the electrically charged film 3 and the counter electrode 2. To set this gap, it is also possible to provide a window part (see through hole or transparent member) at a suitable location of the lower bridge 134 to enable viewing.

The top surface of the first board 1 forms the first facing surface 41 where the counter electrode 2 is provided. The electrically charged film 3 is placed at the second facing surface 42 of the rotating second board 4. In the same way as the other embodiments, the electrically charged film and the counter electrode may be attached to the board in reverse. In the same way as the fifth embodiment of FIG. 19, at the bottom surface of the mounting part 37 of the main plate 33 (reference mounting surface S), a first facing surface 41 to which the counter electrode 2 of the first board 1 is set is attached, so the effects of variation in thickness of the board itself can be eliminated. In the upper bridge 35, instead of the above bearing part 60, the top part of the shaft 8 is axially supported by a bearing part where the leaf spring 68 pushes against the front end of the tenon 8' of the shaft 8. Therefore, the shaft 8 is constantly being pushed toward the lower bearing part 50 of the lower bridge 134, so the play between the electrically charged film 3 and the counter electrode 2 in the axial direction is eliminated.

The position adjusting part for adjusting the gap between the electrically charged film 3 and the counter electrode 2 in the present embodiment will be explained. A position adjusting screw 86 screwed into the main plate 33 and a holding bolt 85 screwed into a screw hole provided at the inside of the position adjusting screw 86 form the position adjusting part. At the bottom of the screw hole of the main plate 33 into which the position adjusting screw 86 is screwed, a spring 87 is inserted. The spring 87 pushes against the end part of the position adjusting screw 86 and eliminates the backlash of the position adjusting screw 86. The outer circumferential end of the lower bridge 134 is fastened with respect to position adjusting screws 86 by passing holding bolts 85 through a plurality of boles 89 provided at its outer circumference side. The position adjusting screws 86 and the holding bolts 85 may have threads in opposite directions to each other (reverse threads) or threads in the same direction, but reverse threads are preferable since the position adjusting screws 86 becomes resistant to slight movement when fastening the holding bolts 85.

When adjusting the gap between the electrically charged film 3 and the counter electrode 2, first, a driver is inserted into the grooves 88 to screw the position adjusting screws 86 into the main plate 33. The gap between the electrically charged film 3 and the counter electrode 2, that is, the axial direction position of the rotating second board 4, is made suitable by adjusting and setting the screwed in positions of the position adjusting screws 86. After setting, the holding bolts 85 are screwed into the screw holes of the position adjusting screws 86. These fasten the lower bridge 134 by clamping the two circumferential ends.

In this way, in the present embodiment as well, in addition to the effects explained in the first embodiment, positioning of the second board 4 can be made relatively easy and simple and accurate adjustment becomes possible. Due to this, it becomes possible to reduce the loosening of the shaft 8, prevent the effect of a change in posture, and, further, obtain a stable amount of power generation.

Ninth Embodiment

Figure 22:
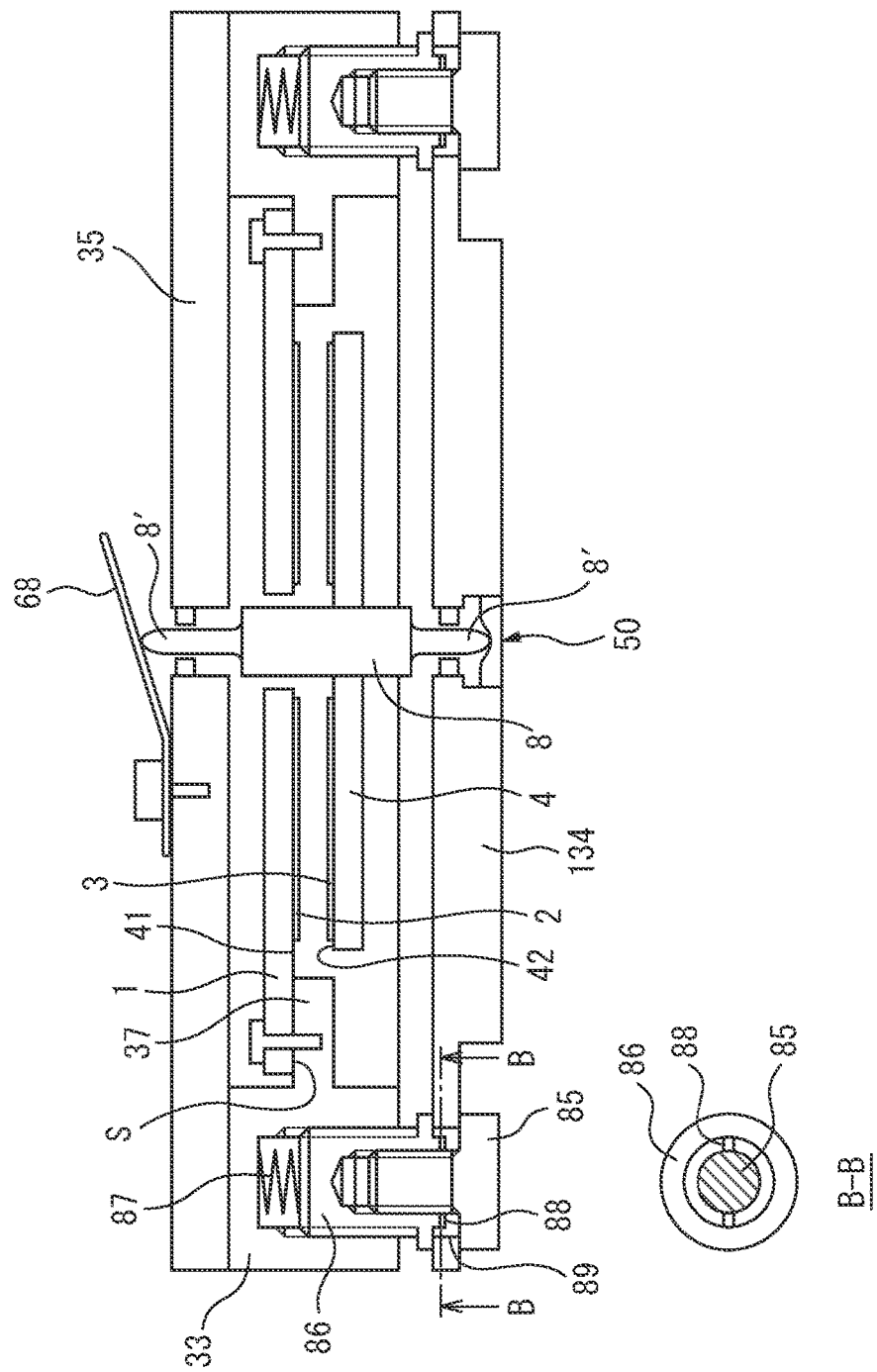
FIG. 22 is a schematic cross-sectional view showing a ninth embodiment of the present invention.

FIG. 22 is a schematic cross-sectional view showing a ninth embodiment of the present invention. The cross-sectional view along the line B-B at the bottom left of the figure is the same as the eighth embodiment.

The ninth embodiment is an embodiment comprised of the above explained eighth embodiment wherein the reference mounting surface S is set at the top surface of the mounting part 37. The bottom surface of the first board 1 is the first facing surface 41 where the counter electrode 2 is provided. On the other hand, the electrically charged film 3 is arranged at the second facing surface 42 of the top surface of the rotating second board 4. In the eighth embodiment, if the lower bridge 134 was lifted up above in the figure, the gap between the electrically charged film 3 and the counter electrode 2 grew wider, but in the ninth embodiment, the reverse happens and the gap between the electrically charged film 3 and the counter electrode 2 becomes narrower. The rest of the configuration and effects are the same as the eighth embodiment. Note that, in the same way as the ninth embodiment, it is possible to apply the configuration setting the reference mounting surface S at the top surface of the mounting part 37 in the first to sixth embodiments as well. In this case, in the same way as the ninth embodiment, it is sufficient to arrange the bottom surface of the first board 1 as the first facing surface 41 and arrange the top surface of the rotating second board 4 as the second facing surface 42.

In the present invention, as relative movement, translational motion, rotational motion, reciprocating translational vibration, rotational vibration, etc. are included. The "vibration" referred to here is defined as including not only regular vibration, but also irregular vibration in the case of extracting electric power from sources of energy widely available in the environment. Further, "rotational motion" is used in a sense including not only one-way rotation, but also rotational vibration and rocking vibration.

Note that, the present invention is not limited in scope to the above mentioned embodiments and includes various changes to the above embodiments in a scope not departing from the gist of the present invention. That is, the specific configurations described in the embodiments are just examples and can be suitably changed.

REFERENCE SIGNS LIST 1. first board
2. counter electrode
3. electrically charged film
4. second board
8. shaft
41. first facing surface
42. second facing surface
S. reference mounting surface

The invention claimed is:

1. A board arrangement structure comprising:
a housing having a reference mounting surface;
a first board having a first facing surface and fastened to said housing;
a second board having a second facing surface and arranged in an orientation enabling relative movement with respect to the first board;
an electrically charged film;
a counter electrode arranged facing said electrically charged film; and
an output part outputting electric power generated between said electrically charged film and said counter electrode;
wherein either one of said electrically charged film and said counter electrode is arranged at said first facing surface and the other is arranged at said second facing surface,
said first facing surface of said first board is fastened to said reference mounting surface,
a shaft is provided with said second board and said shaft is able to rotate at an upper bearing part and a lower bearing part provided at said housing,
either one of said upper bearing part and lower bearing part or both has a first screw adjusting an axial position of said shaft, and
said first screw is provided with a second screw preventing said first screw from loosening, said second screw locking axial positions of said shaft and said first screw.

2. The board arrangement structure according to claim 1, wherein said housing has a biasing mechanism biasing said shaft to either bearing part of said upper bearing part and lower bearing part, and
said biasing mechanism uses a spring or magnet.

3. The board arrangement structure according to claim 2, wherein said either bearing part has said first screw.

4. The board arrangement structure according to claim 1, wherein a rotor having an uneven weight balance for rotor is transmitted to for rotating said shaft of said second board is provided on said shaft.

5. The board arrangement structure according to claim 1, wherein a rotor having an uneven weight balance for rotating said shaft of said second board is provided on a second shaft supported separately from said shaft, and
rotation of said rotor in both forward and reverse directions is converted into rotation in one direction and transmitted to said shaft of said second board through a gear train.

6. A board arrangement structure comprising:
a housing having a reference mounting surface;
a first board having a first facing surface and fastened to said housing;
a second board having a second facing surface and arranged in an orientation enabling relative movement with respect to the first board;
an electrically charged film;
a counter electrode arranged facing said electrically charged film; and
an output part outputting electric power generated between said electrically charged film and said counter electrode;
wherein either one of said electrically charged film and said counter electrode is arranged at said first facing surface and the other is arranged at said second facing surface
said first facing surface of said first board is fastened to said reference mounting surface, and wherein an electronic circuit including at least a rectifier circuit is arranged at the opposite side from the first facing surface of said first board.

7. A board arrangement structure comprising:

a housing having a reference mounting surface;

a first board having a first facing surface and fastened to said housing;

a second board having a second facing surface and arranged in an orientation enabling relative movement with respect to the first board;

an electrically charged film;

a counter electrode arranged facing said electrically charged film; and an output part outputting electric power generated between said electrically charged film and said counter electrode;

wherein either one of said electrically charged film and said counter electrode is arranged at said first facing surface and the other is arranged at said second facing surface, said first facing surface of said first board is fastened to said reference mounting surface, a shaft is provided with said second board and said shaft is able to rotate at an upper bearing part and a lower bearing part provided at said housing, said housing includes a first housing part, a second housing part, and a position adjusting part adjusting the first housing part with respect to the second housing part to be able to position it in the axial direction of said shaft, said first housing part is provided with at least one bearing part of said upper bearing part and lower bearing part, said second housing part is provided with the other bearing part of said upper bearing part and lower bearing part, said reference mounting surface to which said first board is fastened, and a biasing mechanism biasing said shaft to said one bearing part, and said position adjusting part is provided with a position adjusting screw screwed into the second housing part and a holding bolt screwed into a screw hole provided inside the position adjusting screw, said first housing part being positioned by said holding bolt with respect to the position adjusting screw.

* * * * *